United States Patent
Takamatsu et al.

(10) Patent No.: US 7,471,402 B2
(45) Date of Patent: Dec. 30, 2008

(54) PRINTING APPARATUS AND PRINTING METHOD

(75) Inventors: Ryuichiro Takamatsu, Osaka (JP); Kazuyuki Murata, Kyotanabe (JP)

(73) Assignee: Panasonic Corporation, Osaka (JP)

( * ) Notice: Subject to any disclaimer, the term of this patent is extended or adjusted under 35 U.S.C. 154(b) by 1043 days.

(21) Appl. No.: 10/807,315

(22) Filed: Mar. 24, 2004

(65) Prior Publication Data
US 2004/0190055 A1 Sep. 30, 2004

(30) Foreign Application Priority Data
Mar. 28, 2003 (JP) ............... 2003-092412

(51) Int. Cl.
*G06F 15/00* (2006.01)
(52) U.S. Cl. ............ 358/1.13; 358/1.15; 358/1.2; 358/1.9; 358/448
(58) Field of Classification Search ............ 358/1.2, 358/1.6, 1.9, 1.13, 1.14, 1.15, 1.16, 501, 358/518, 527, 537, 444, 448, 452; 382/233
See application file for complete search history.

(56) References Cited

U.S. PATENT DOCUMENTS 6,281,979 B1   8/2001   Atobe et al.
7,009,728 B1 * 3/2006   Hara et al. ............... 358/1.16
2003/0016387 A1 * 1/2003 Takagi et al. ............ 358/1.15

FOREIGN PATENT DOCUMENTS

| CN | 1113583 | | 12/1995 |
|---|---|---|---|
| JP | 2000059635 A | * | 2/2000 |
| JP | 2000-267829 | | 9/2000 |
| JP | 2001-195208 | | 7/2001 |
| JP | 2001-197406 | | 7/2001 |
| JP | 2003-078844 | | 3/2003 |

* cited by examiner

*Primary Examiner*—Edward L Coles
*Assistant Examiner*—Chan S Park
(74) *Attorney, Agent, or Firm*—Wenderoth, Lind & Ponack, L.L.P.

(57) ABSTRACT

A printing apparatus generates print data with a priority given to a processing speed over a quality of images, even without explicit instructions, when printing images which do not require a high quality. The printing apparatus includes a priority decision unit for deciding whether to prioritize a speed of processing the image data or a quality of the images at the time of printing, based on print content description data including information on layout instructions for printing the images. The printing apparatus also includes a print data generation unit for generating print data including the images, based on the print content description data, the decision made by the priority decision unit, and the image data, and a print unit for printing the print data generated by the print data generation unit.

10 Claims, 6 Drawing Sheets

```
<?xml version="1.0" encoding="EUC-JP"?>
<!DOCTYPE html PUBLIC "-//PWG//DTD XHTML-Print 1.0//EN"
"http://www.xhtml-print.org/xhtml-print/xhtml-print10.dtd">
<html xmlns="http://www.w3.org/1999/xhtml">
<head>
<meta http-equiv="Content-Style-Type" content="text/css"/>
</head>
<body>
...(omitted)...
<tr>
<td><img src="AAAA0001.jpg" width="160" height="120" /></td>
<td><img src="AAAA0002.jpg" width="160" height="120" /></td>
<td><img src="AAAA0003.jpg" width="160" height="120" /></td>
<td><img src="AAAA0004.jpg" width="160" height="120" /></td>
<td><img src="AAAA0005.jpg" width="160" height="120" /></td>
</tr>
...(omitted)...
</body>
</html>
```

FIG. 3A honbun.html

```
<?xml version="1.0" encoding="EUC-JP"?>
<!DOCTYPE html PUBLIC "-//PWG//DTD XHTML-Print 1.0//EN"
  "http://www.xhtml-print.org/xhtml-print/xhtml-print10.dtd">
<html xmlns="http://www.w3.org/1999/xhtml">
<body>
<object data="./mobile1.jpg" type="image/jpeg" width="120" height="160">
<param name=imagepriority value=thumbnail valuetype=data></param>
</object>
<object data="./mobile2.jpg" type="image/jpeg" width="120" height="160">
<param name=imagepriority value=thumbnail valuetype=data></param>
</object>
<p>
Three types of athletics were held in Ikaho-machi, Maebashi-City and
Takasaki-City in Gunma prefecture on the 29th, the last day of the 58th
National Sports Festival.  Nagano prefecture won both an overall men's and
women's championship (Emperor's Cup) and an overall women's
championship (Empress's Cup) in basketball games.  As for soccer
matches, Chiba prefecture won the first place, Fukuoka prefecture won
the second place ··· (omitted) ···
</p>
</body>
</html>
```

FIG. 3B mobile1.jpeg

FIG. 3C mobile2.jpeg

FIG. 4

Three types of athletics were held in Ikaho-machi, Maebashi-City and Takasaki-City in Gunma prefecture on the 29th, the last day of the 58th National Sports Festival. Nagano prefecture won both an overall men's and women's championship (Emperor's Cup) and an overall women's championship (Empress's Cup) in basketball games. As for soccer matches, Chiba prefecture won the first place, Fukuoka prefecture won the second place ... (omitted) ...

FIG. 5

PRINTING APPARATUS AND PRINTING METHOD

BACKGROUND OF THE INVENTION (1) Field of the Invention

The present invention relates to a printing apparatus for printing image data obtained by a digital camera or the like, and the printing method.

(2) Description of the Related Art

When a home printer prints the image data obtained by a digital camera, a user conventionally transmits the image data to a personal computer (PC). The user then selects the image to be printed and performs graphic processing on the selected image by using an application installed in the PC, transmits the image data from the PC to the printer and has the printer print it.

Figure 1:
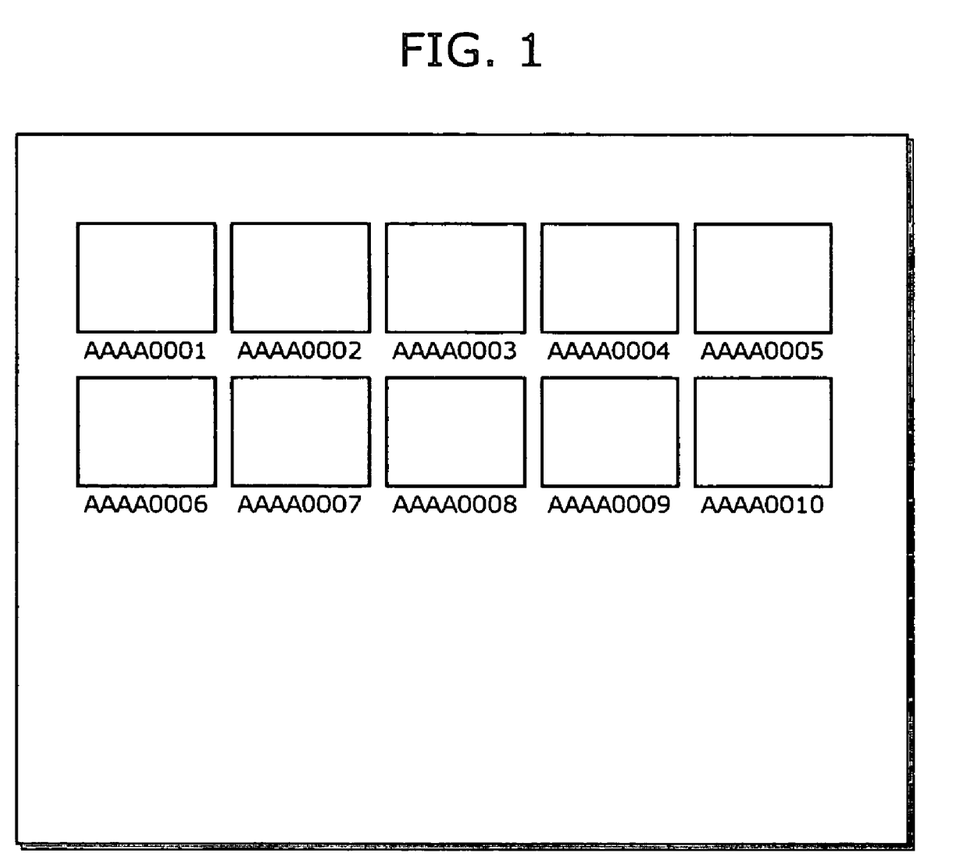
FIG. 1 shows print data of the print image (for index print) based on the print content description data shown in FIG. 2.

Recently, however, with the spread of digital cameras, systems have been conceived with the view to facilitate printing. One of the examples is a system in which a digital camera and a printer are connected directly without PC, the image data obtained by the digital camera is transmitted directly to the printer, and the printer prints the image data. Under such system, generally referred to as a "direct-printing system", a liquid-crystal-display screen for displaying the images to be printed is loaded on the digital camera or on the printer so that the user can select easily the images for printing. A method of creating an index print, in which plural thumbnail images are arranged in an array as shown in FIG. 1, is employed as well by the printer. In this case, the user selects the image to be printed while looking at the index print. It should be noted that FIG. 1 shows an example of print data for the images in the index print. Most of the image data obtained by the digital camera is a file in an Exchangeable Image File (Exif) format which includes, in a single file, the image data of main images and that of thumbnail images having a resolution lower than that of main images. The printer obtains only the image data of thumbnail images included in the Exif file, when creating an index print. The data amount of thumbnail images is smaller than that of main images. It is therefore possible to shorten the time required for creating the index print in the case where the printer obtains only the image data of thumbnail images (see reference to, for example, Japanese Open-Laid Patent Application No. 2001-197406 for an exclusive obtainment of the image data of thumbnail images).

Meanwhile, another way of handling easily the images based on the image data obtained by the digital camera is to display the images on a TV screen at home. For example, some digital TVs of the latest technology are equipped with a memory-card slot. When a memory card, on which the image data obtained by the digital camera is stored, is inserted into the memory-card slot, the digital TV reads out the image data stored in the memory card and displays on the display the images based on the image data.

An application for processing the image data obtained by the digital camera is installed in an AV (Audio-Visual) device such as the digital TV as described above, or the like. A system, in which the printer, directly connected to the AV device, prints the image data based on print content description data that is generated by such application, has been conceived. However, under a non-PC printing system in which an AV device other than a digital camera and a PC (hereinafter to be referred to as a "host device") serves as a host, a host device does not have a sufficient resource such as a memory for generating print data as the PC does, and also, operating systems (OS) of the host devices differ from one another, depending on a company. It is therefore difficult to install, into the host device, plural printer drivers corresponding to each printer.

Figure 2:
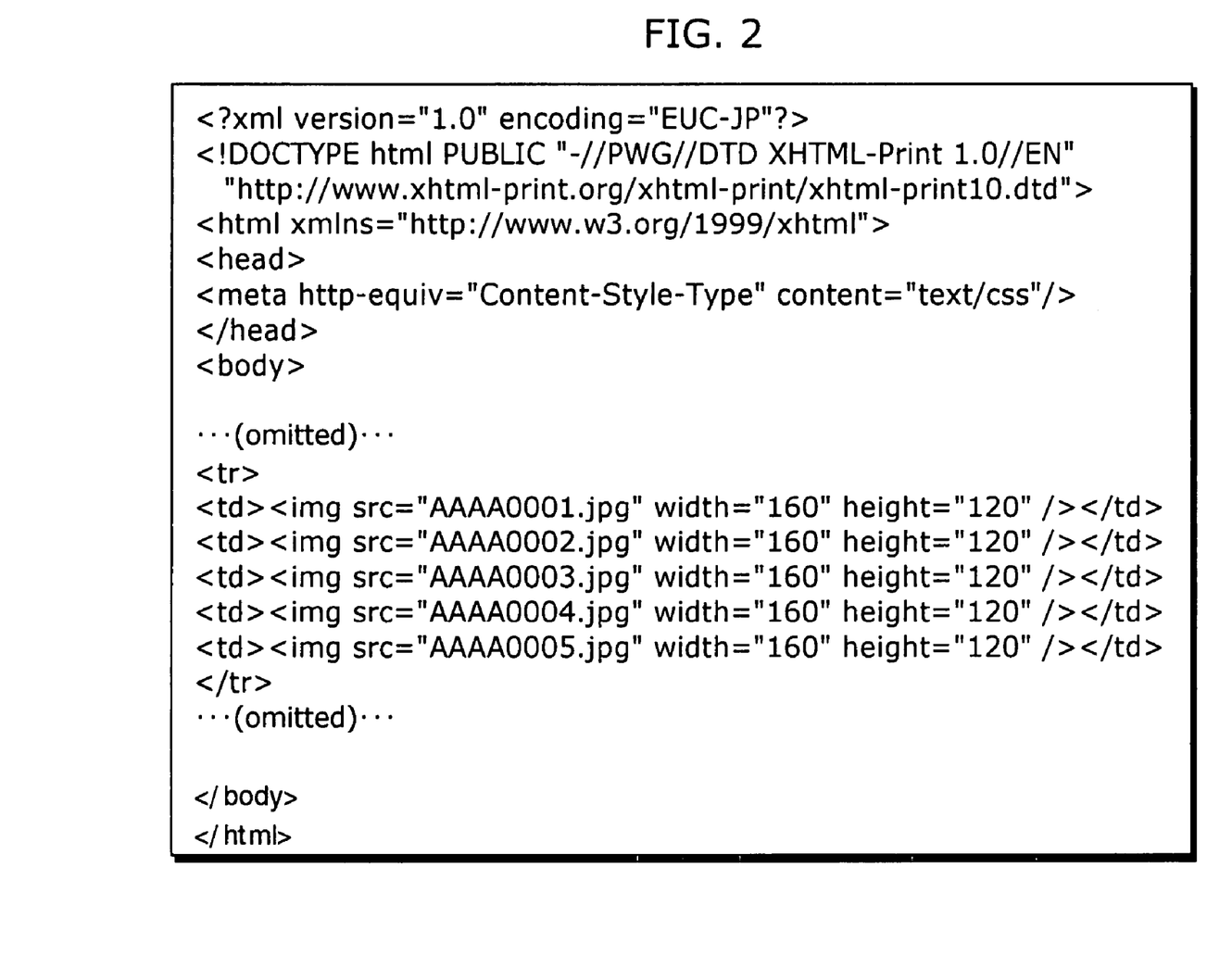
FIG. 2 shows an example of the print content description data described in XHTML-Print.
Figure 3A:
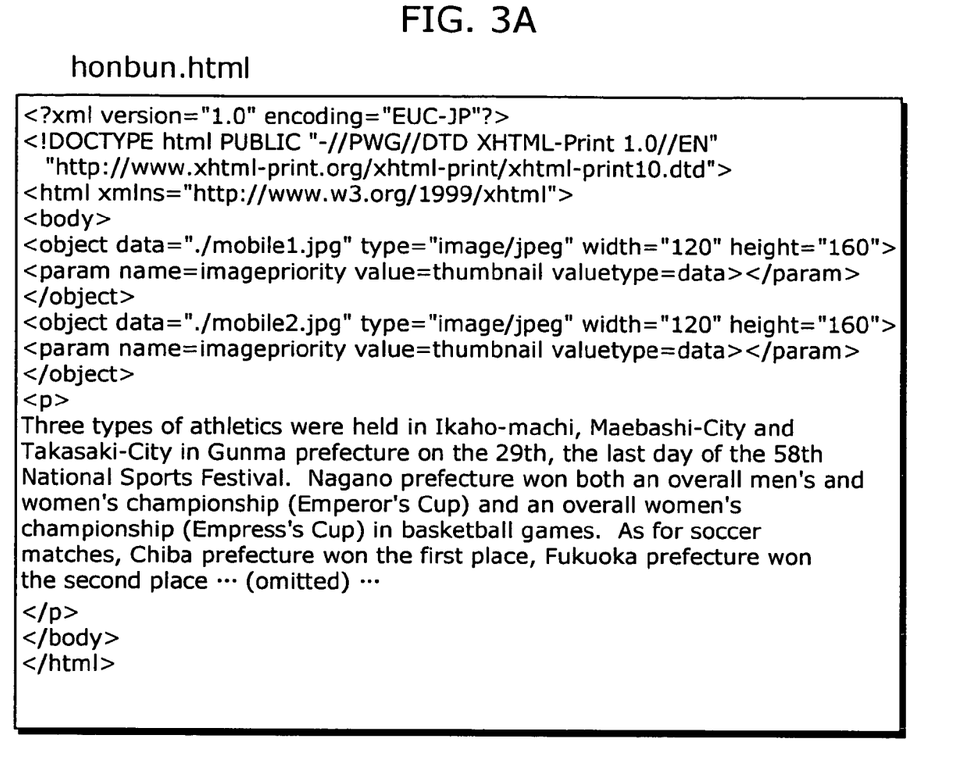
Figure 3B:
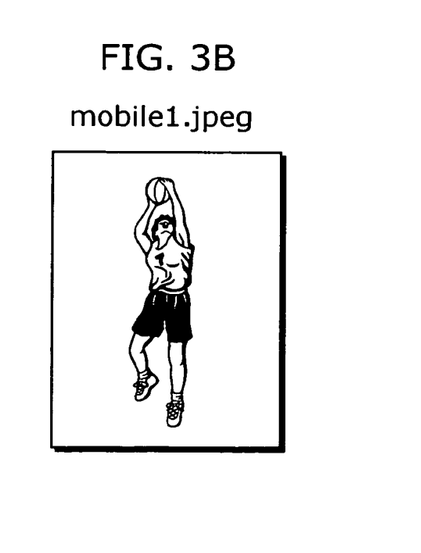
FIGS. 3B and 3C show examples of the image data specified in the print content description data shown in FIG. 3A.
Figure 3C:
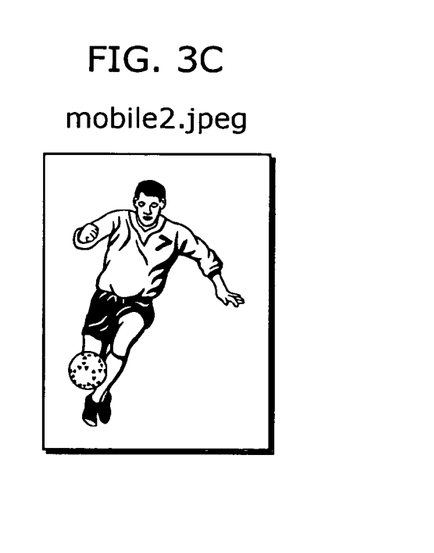
Figure 4:
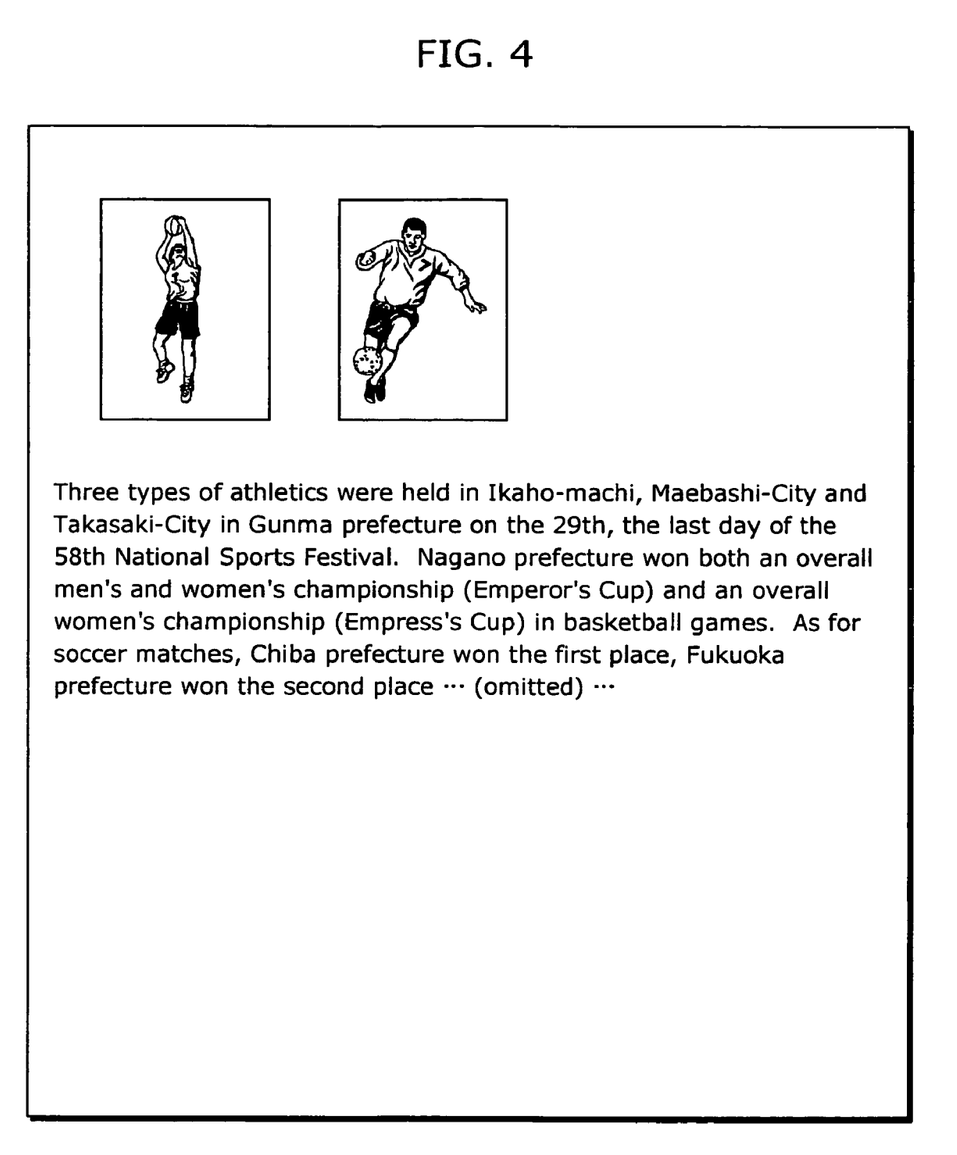
FIG. 4 shows print data of the print image based on the print content description data shown in FIG. 3A.

Consequently, under the non-PC printing system, the host device which instructs on printing generates only print content description data using a description language that the printer can analyze, but does not generate print data as in the case of using a normal printer driver installed in the PC. It is the printer that analyzes the print content description data and generates print data. That is to say, the host device generates the print content description data in a text format as shown in FIGS. 2 and 3A, while the printer generates the print data of bit image as shown in FIGS. 1 and 4 based on the print content description data. Under the non-PC printing system as described above, the printer detects a location (file pass) of the image data (e.g., FIGS. 3B and 3C) necessary for printing and obtains the image data actively. It should be noted that FIGS. 2 and 3A show examples of the print content description data while FIGS. 3B and 3C show examples of the image data. FIGS. 1 and 4 show examples of the print data of bit image. The print content description data here means the data described by the print content description language.

Under the direct-printing system, in which the printer prints the image data directly transmitted from the digital camera, the printer uses only the image data of thumbnail images in the Exif file, which is obtained from the digital camera in the case of creating an index print, as already mentioned above. Thus, the printer uses the image data of thumbnail images, not the image data of main images. Therefore, the time required to complete the printing of the index print using the image data of thumbnail images is shorter, compared to the case of the printing with the use of the image data of main images.

On the other hand, under the non-PC printing system, it is the application installed in the host device that generates the print content description data, as mentioned above. In the case of creating an index print, it is the application that generates the print content description data for index print, using the description language which can be analyzed by the printer. That is to say, the application generates the print content description data which indicates that the plural images are arranged in an array to be printed. The host device then transmits, to the printer, the print content description data for index print.

The printer, having received such print content description data, however, processes in the same manner as required for a normal photo printing, unless that the print content description data is for index print is explicitly indicated. Namely, the printer does not obtain the image data of thumbnail images included in the Exif file, but the image data of main images from the host device. The printer, with a function to process high-quality image, also performs the high quality image processing on image data, as in the normal case. Thus, the printer, if equipped with such function, obtains the image data of main images which requires a huge data amount, and performs the high-quality image processing on the obtained image data. Therefore, it requires a huge amount of time in order to complete the printing of the index print.

The general aim of creating an index print, in many cases, is to obtain a list of plural images in order to see the images or to get the names of the files. That is to say, the high-quality image printing as required for a normal photo printing is not required so much in such cases. It is therefore possible to reduce the time required for printing the print content description data for index print generated by the application in the host device, provided that printing the index print, which is different from the normal photo printing, is operated.

For this, all that is needed is to indicate explicitly that the print content description data transmitted from the host device is for printing an index print. In order to realize this, it is conceivable that the host device sends to the printer a command indicating that the print content description data for index print has been transmitted. In this case, however, it is required that both the host device and the printer understand such command. This can be realized when the host device and the printer are the products of the same maker since a command can be uniquely defined by each maker. In the case in which the host device and the printer are the products of different makers, a command needs to be standardized. As far as the command is not standardized, the printer obtains the image data of main images having a huge data amount for all the images to be listed up in the index print, and generates the print data, unless it is explicitly indicated that the print content description data is for index print. This requires a great amount of time for printing the index print.

Under the non-PC printing system, the printer obtains the image data of main images having a huge amount of data regardless of the number of pixels in the image at the time of printing, and generates the print data for printing the images other than those for index print. When an image is printed at the number of pixels that is smaller than a predetermined number of pixels, for example, in a case of printing image data of 1600×1200 pixels as a bit image of 160×120 pixels, or in the similar cases, a great part of the pixels in the original image data are cut off. Also, printing images with high quality is not specially required since the printing area is small. This is because, for the above case, human beings cannot judge whether the printed image is of high or low quality. In this case, where the printing images with high quality is not required, the printer obtains the image data of main images requiring a huge amount of data and generates the print data, in spite that the print data can be generated from the image data of thumbnail images. Consequently, it requires a great amount of time for printing the data.

As is mentioned above, under the non-PC printing system, the printer obtains the image data of main images requiring a huge amount of data and generates the print data, without explicit instructions, even when printing with high quality is not required as in the case of printing an index print or in the case of printing the image whose number of pixels is smaller than a predetermined number of pixels. As a result, it requires a great amount of time for printing the data.

SUMMARY OF THE INVENTION

An object of the present invention, in view of above problems, is to provide a printing apparatus for generating the print data by giving priority to a processing speed over an image quality, even without explicit instructions, in a case where the quality of the images at the time of printing does not matter.

In order to achieve the above object, the printing apparatus according to the present invention for printing images based on image data, comprising: a priority decision unit operable to decide which to prioritize, a quality of the images at the time of printing or a speed of processing the image data, based on print content description data including information on layout instructions for printing the images; and a print data generation unit operable to generate print data including the images, based on the following: the print content description data, the decision made by the priority decision unit, and the image data; and a printing unit operable to print the print data generated by the print data generation unit.

For example, in a case where a plurality of images are arranged in a sheet, and the print content description data indicates that the plurality of images are arranged in the sheet to be printed, the priority decision unit decides to prioritize the speed of processing the image data rather than the quality of each of the plurality of images at the time of printing, and the print data generation unit generates the print data based on said decision made by the priority decision unit. For another example, in a case where a plurality of images are arranged in a sheet, the print content description data indicates that: i) the plurality of images are arranged in the sheet to be printed; and ii) each of the plurality of images is printed at the number of pixels smaller than a predetermined number of pixels, the priority decision unit decides that the speed of processing the image data should be prioritized rather than the quality of said each of the plurality of images at the time of printing, and the print data generation unit generates the print data based on said decision made by the priority decision unit. And yet for another example, in a case where: 1) a plurality of images are arranged in a sheet; 2) the print content description data indicates that: i) the plurality of images are arranged in the sheet to be printed, and ii) each of the plurality of images is printed at the number of pixels smaller than a predetermined number of pixels; and 3) the plurality of images are different from one another, the priority decision unit decides that the speed of processing the image data should be prioritized rather than the quality of said each of the plurality of images at the time of printing, and the print data generation unit generates the print data based on said decision made by the priority decision unit. Furthermore, in a case where the print content description data indicates that the images are to be printed at the number of pixels smaller than the predetermined number of pixels, the priority decision unit decides that the speed of processing the image data should be prioritized rather than the quality of each of the images at the time of printing, and the print data generation unit generates the print data based on said decision made by the priority decision unit.

For example, when the priority decision unit decides to prioritize the speed of processing the image data rather than the quality of the images at the time of printing, the following cases are conceivable: (A) in a case where the print content description data includes both the image data of high resolution and the image data of low resolution for each of the plurality of images, the print data generation unit generates the print data based on the image data of low resolution; (B) in a case where the print data generation unit generates the print data by partly skipping plural steps taken in processing the image data; and (C) in a case where Joint Photographic Experts Group format is used as a format of the image data, the print data generation unit generates the print data by decoding only a Direct Current component of the image data.

Thus, the printing apparatus according to the present invention gives priority to the speed of generating the print data, even without explicit instructions, in the case of printing images which do not require a high quality.

Furthermore, the present invention can be also realized as the printing method incorporating the steps having the characteristics acknowledged in the units included in the printing apparatus of the present invention, or as a program on which these steps are included. The program can be distributed through a storage medium such as a CD-ROM and the like, or a transmission medium such as a communication network and the like.

The present invention can provide the printing apparatus for generating print data with a priority given to a processing speed over an image quality, even without explicit instructions, in the case where the quality of the images at the time of printing does not matter.

For further information about technical background to this application, Japanese Patent Application No. 2003-092412, filed on Mar. 28, 2003, is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3A shows an example of the print content description data described in the XHTML-Print while

DESCRIPTION OF THE PREFERRED EMBODIMENT(S)

The following describes the best mode for implementing the present invention with reference to the accompanying drawings.

Firstly, the configuration of the non-PC printing system according to the present embodiment will be explained with reference to FIGS. 1~5.

FIG. 1 shows the print data of bit image. FIGS. 2 and 3A show respectively the example of the print content description data while FIGS. 3B and 3C show the examples of the image data. FIG. 4 shows the print data of bit image. It should be noted that FIGS. 1~4 will be explained in detail after the description of the configuration in the non-PC printing system.

Figure 5:
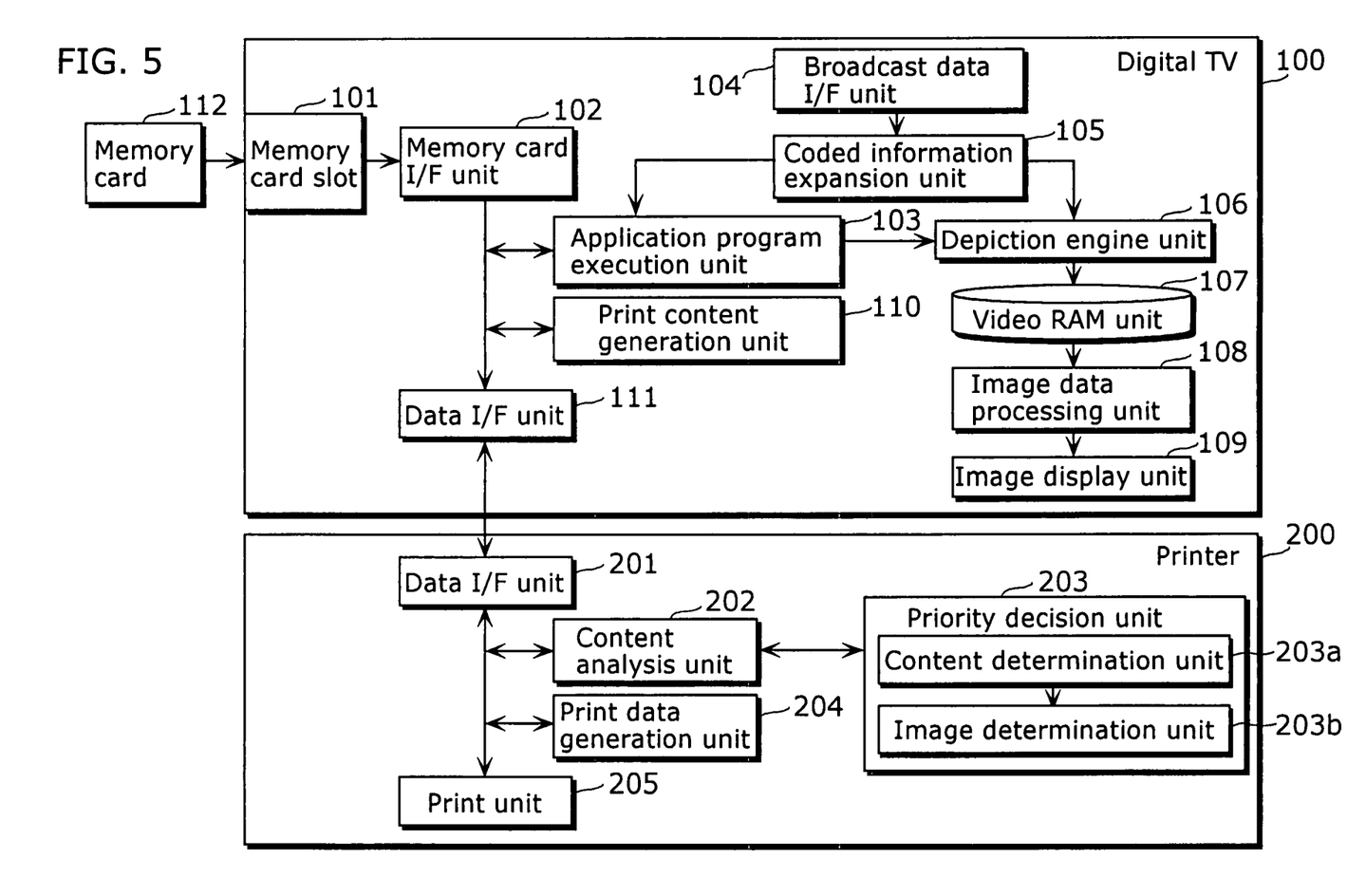
FIG. 5 is a block diagram showing the configuration of the non-PC printing system according to the present embodiment.

FIG. 5 is a block diagram showing the configuration of the non-PC printing system according to the present embodiment. The present non-PC printing system is composed of a digital TV 100, which serves as a non-PC host device, and a printer 200.

The digital TV 100, a device which receives and displays the digital broadcast as well as instructs the printer 200 to print images, is composed of the following: a memory-card slot 101, a memory card Interface (I/F) unit 102, an application program execution unit 103, a broadcast data I/F unit 104, a coded information expansion unit 105, a depiction engine unit 106, a video Random Access Memory (RAM) unit 107, an image data processing unit 108, an image display unit 109, a print content generation unit 110, and data I/F unit 111.

The memory-card slot 101 is a part where a memory card 112, which is to be mentioned later on, is inserted. In the case where the memory card 112, on which the image data obtained by the digital camera is stored, is inserted in the memory-card slot 101, the memory card I/F unit 102 can access to the image data stored on the memory card 112.

The application program execution unit 103, on which plural application programs are mounted, executes each of the application programs. The application program may be, for example, a viewer function for displaying, by the image display unit 109, the image data stored on the memory card 112 or a program for operating a printing function.

The broadcast data I/F unit 104 performs predetermined processing on the broadcast data received via an antenna or a cable which is not shown in the diagram, and outputs the processed broadcast data to the coded information expansion unit 105. For example, the broadcast data I/F unit 104 converts the broadcast data into Moving Picture Experts Group (MPEG) data, Broadcast Markup Language (BML) data, extensible HyperText Markup Language (XHTML) data or data in other format and outputs it to the coded information expansion unit 105. The coded information expansion unit 105 performs extraction of the coded information compliant with the format of the inputted data, extraction of the image data, and others. The data processed by the coded information expansion unit 105 is transmitted to the application program execution unit 103 and the depiction engine unit 106.

The depiction engine unit 106 depicts, on the video RAM unit 107, the data for display that is transmitted from the application program execution unit 103 and the coded information expansion unit 105. The video RAM unit 107 is a memory that includes an area for storing the data. The data depicted on the video RAM unit 107 is then transmitted to the image data processing unit 108. The image data processing unit 108 performs predetermined processing on the inputted image data and provides the image display unit 109 with it. The image display unit 109 is a display device such as CRT, LCD, PDP and projector, and displays the image based on the image data processed by the image data processing unit 108.

The print content generation unit 110 generates print content description data using the print content description language that can be analyzed by the printer 200, based on the data outputted from the application program execution unit 103. It should be noted that the application program execution unit 103 receives printing instructions from an input interface like a remote controller of the digital TV 100 (not shown in the diagram) operated by the user, and transmits the data necessary for generating print content description data. The print content generation unit 110 generates print content description data based on the data received from the application program execution unit 103. The print content generation unit 110 uses XHTML-Print as a description language for generating the print content description data. The example of the print content description data generated by the print content generation unit 110 will be mentioned later with reference to FIGS. 2 and 3A. The print content generation unit 110 then transmits the generated print content description data to the data I/F unit 111. The data I/F unit 111 sends and receives the data to and from the printer 200.

The memory card 112 is a portable storage medium on which the image data obtained by the digital camera is stored.

The following describes the printer 200 according to the present embodiment. The printer 200 generates print data based on the print content description data transmitted from the digital TV 100 that is also a non-PC host device, and outputs the print data on a sheet. The printer 200 is composed of the following: a data I/F unit 201, a content analysis unit 202, a priority decision unit 203, a print data generation unit 204, and a print unit 205.

The data I/F unit 201 sends and receives the data to and from the digital TV 100, and sends the print content description data received from the digital TV 100 to the content analysis unit 202. It should be noted that the communication between the digital TV 100 and the printer 200 is operated through the data I/F units 111 and 201. The data I/F units 111 and 201 are connected via an Ethernet, Institute of Electrical and Electronic Engineers 1394 (IEEE 1394) bus, a Universal Serial Bus (USB), or other line, and send/receive the data in a format compliant to the bus that is used for connection.

The content analysis unit 202 analyzes one after another the print content description data described in the XHTML-Print, and determines a layout of the print data. It should be noted that the transmission of the data is allowed between the content analysis unit 202 and the priority decision unit 203.

When the content analysis unit 202 analyzes information on layout instructions for printing the images, which is included in the print content description data, the priority decision unit 203 decides to prioritize either a quality of the images at the time of printing or a speed of processing image data, based on a result of the analysis obtained by the content analysis unit 202. It should be noted that the priority order decision unit 203 has a content determination unit 203a and an image determination unit 203b, as shown in FIG. 5. The content determination unit 203a determines to prioritize either a quality of the images at the time of printing or a speed of processing the image data, by detecting whether or not the print content description data is intended for index print. The image determination unit 203b determines to prioritize either a quality of the images at the time of printing or a speed of processing the image data, by detecting the number of pixels in the image at the time of printing.

After the determination of the layout for the print data, the content analysis unit 202 transmits the layout to the print data generation unit 204. When the priority decision unit 203 has already decided to prioritize either a quality of the images at the time of printing or a speed of processing the image data, the content analysis unit 202 also transmits, to the print data generation unit 204, the result of the determination made by the priority decision unit 203.

The print data generation unit 204 generates the print data based on the result of analysis obtained from the content analysis unit 202. When the print content description data includes the information relating to the printing of the images, the print data generation unit 204 detects a location of the image file included in the image data, based on the result of the analysis obtained from the content analysis unit 202, and obtains the image data based on the result of the detection. For example, in the case where the memory card 112 stores the image data, the print data generation unit 204 obtains the image data from the memory card 112 which is inserted in the memory-card slot 101 of the digital TV 100, via the memory card I/F unit 102. Moreover, the print data generation unit 204 performs processing such as high-quality image processing on the obtained image data. The high-quality image processing here can be processing of, for instance, noise reduction, gain control, contrast conversion, color balance, color correction, color adjustment, sharpness and so on. The print data generation unit 204 then eventually generates print data of bit image to be outputted to the print unit 205. It should be noted that an example of the print data generated by the print data generation unit 204 will be mentioned later with reference to FIGS. 1 and 4. The print unit 205 outputs on a sheet the print data of bit image generated by the print data generation unit 204.

Next, an example of the print content description data generated by the print content generation unit 110 as well as an example of the print data generated by the print data generation unit 204 based on the print content description data will be explained later with reference to FIGS. 1~4.

FIGS. 2 and 3A show the examples of the print content description data described in the print content description language. FIG. 2 shows the print content description data indicating that the content is for index print in which each of the images is arranged in an array by describing a tag <img> indicating a location of each of the images in an array, as a table element, as shown in the section starting from "<td><img src="aaaa0001.jpg"width="160"height="120"/></td>" until "<td><img src="aaaa0005.jpg"width="160"height="120/></td>". FIG. 3A shows the print content description data in which a location of each image is described using a tag <object>, as shown by "<object data="./mobile1.jpg"type="image/jpeg"width="120"height="160">"and "<object data="./mobile2. jpg"type="image/jpeg"width="120"height=160">". FIGS. 3B and 3C show the images specified in the print content description data shown in FIG. 3A.

FIGS. 1 and 4 show the examples of the print data generated by the print data generation unit 204. FIG. 1 shows a sketch of the print data based on the print content description data shown in FIG. 2 while FIG. 4 shows the print data of the bit image based on the print content description data shown in FIG. 3A.

Next, an operation of the non-PC printing system according to the present embodiment will be explained with reference to FIG. 6.

Figure 6:
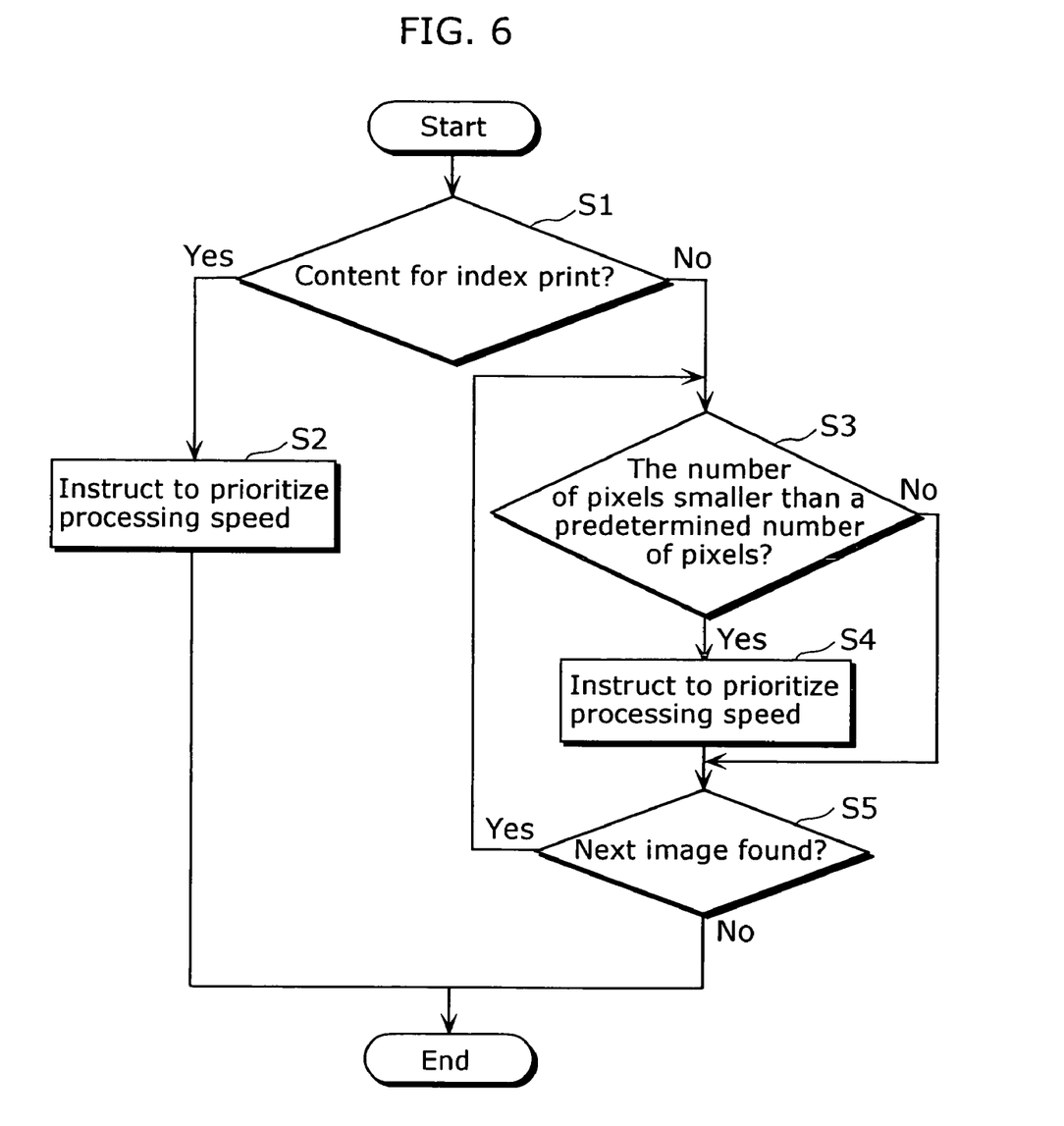
FIG. 6 is a flowchart showing the flow in the operation performed by a priority decision unit 203.

FIG. 6 is a flowchart showing the operation performed by the priority decision unit 203 in the printer 200, under the non-PC printing system according to the present embodiment.

The following describes the operation in the case of printing the image data obtained by the digital camera which is not shown in the diagram, according to the printing instructions sent from the application program execution unit 103 of the digital TV 100, under the non-PC printing system of the present embodiment.

Here, it is assumed that plural image data obtained by the digital camera is stored as an Exif file in the memory card 112. Image data of both high and low resolutions, that is, image data of main images and that of thumbnail images are generated for the image, and the Exif file, as mentioned before, is a file that includes the both types of image data. When the user inserts the memory card 112 in the memory-card slot 101 of the digital TV 100, the application program execution unit 103 is activated. The application execution unit has a function to instruct on the display of the image data stored on the memory card 112 and on the printing of the image data. The user operates the application program execution unit 103 with the use of the remote controller that is not shown in the diagram. The application program execution unit 103 has a function to instruct on the photo printing a piece of image data and/or a function to instruct on the printing of plural pieces of image data on a sheet by reducing its size as in the case of printing an index print.

It is presumed here that the user sends printing instructions for creating an index print to the application program execution unit 103 of the digital TV 100. In this case, the application program execution unit 103 instructs the print content generation unit 110 to generate the print content description data for index print. The print content generation unit 110 generates the print content description data indicating that the plural images based on the plural image data stored on the memory card 112 are printed in a lattice-like arrangement using the print content description language called "XHTML-Print", based on the printing instructions sent from the application program execution unit 103. Here, when it is instructed to output the image data with a file name of, for instance, "AAAA0001.jpg" stored in the memory card 112 at the number of pixels defined as 320 pixels (horizontal)×240 pixels (vertical), the print content generation unit 110 describes the number of pixels in the image at the time of printing as "<img src=AAAA0001.jpg"width="320"height="240"/>, using the print content description language XHTML-Print. When it is instructed to print images in an array respectively at the number of pixels defined as 160 pixels (horizontal)×120 pixels (vertical) for output, in the case of generating the print content description data for printing an index print, the print content generation unit 110 describes the tag <img> indicating a location of the image at a specified number of pixels for output, as shown in FIG. 2. In FIG. 2, it is instructed to layout plural images in an array, using a table element in the XHTML. It should be noted that the detailed settings for the layout can be specified by applying a Cascading Style Sheet (CSS).

In this way, the print content description data described in the XHTML-Print is transmitted to the printer 200 via the data I/F unit 111 of the digital TV 100, and the data I/F unit 201 of the printer 200 receives the print content description data from the digital TV 100.

The data I/F unit 201 transmits the received print content description data to the content analysis unit 202. The content analysis unit 202 then sequentially analyzes the print content description data described in the XHTML-Print, and determines the layout of the print data based on the result of the analysis. Here, since the print content description data includes the information on layout instructions for printing the images, the priority decision unit 203 decides to prioritize either a quality of the images at the time of printing or a speed of processing the image data, based on the result of the analysis obtained from the content analysis unit 202, that is, the layout of the image at the time of printing. In more detail, the priority decision unit 203 decides to prioritize either a quality of the images at the time of printing or a speed of processing the image data, by detecting whether or not the images to be printed are, for instance, for index print, based on the print content description data, or by detecting the number of pixels in the image at the time of printing based on the print content description data. It should be noted that in the present embodiment as mentioned above, it is assumed here that image data in the Exif format is stored on the memory card 112. However, the format of the image data shall not be limited to an Exif format.

The following describes a flow in the operation performed by the priority decision unit 203 with reference to the flowchart shown in FIG. 6.

After the priority decision unit 203 has received the result of the analysis from the content analysis unit 202, the content determination unit 203a judges whether or not the print content description data is intended for index print (S1). It should be noted that an example of the determination method employed by the content determination unit 203a will be mentioned later on. When determining that the print content description data is a content intended for index print (Yes in S1), the content determination unit 203a determines to prioritize a speed of processing image data instead of a quality of the images at the time of printing, and transmits the result of the determination to the content analysis unit 202 (S2). When determining that the print content description data is not a content intended for index print (No in S1), the picture determination unit 203b judges whether or not the number of pixels in one of the images to be printed based on the print content description data is smaller than a predetermined number of pixels (S3). Here, in the case where the number of pixels in the image is smaller than the predetermined number of pixels (Yes in S3), the image determination unit 203b determines to prioritize a speed of processing image data instead of a quality of the images at the time of printing, and transmits the result of the determination to the content analysis unit 202 (S4). The image determination unit 203b then examines whether or not an image, for which the priority should be determined next, is found (S5). In the case where the number of pixels in the image is not smaller than the predetermined number of pixels (No in S3), the processing goes on to this process (S5)

Here, in the case where such image is found (Yes in S5), the processing returns to the process (S3) of determining whether or not the number of pixels in the image is smaller than the predetermined number of pixels. In the case where such image is not found (No in S5), the operation performed by the priority decision unit 203 is terminated. Thus, whether to prioritize a quality of the images at the time of printing or a speed of processing for image data is determined for all the images to be printed, based on the print content description data.

The following describes an example of the determination method employed by the content determination unit 203a. In general, plural small images are arranged in a regular order in the case of printing an index print, as shown in FIG. 1. Therefore, when the content analysis unit 202 analyzes that the print content description data indicates that the images of the same number of pixels which is smaller than the predetermined number of pixels are placed in a lattice-like arrangement, the content determination unit 203a judges that the print content description data is a content for index print, and determines to prioritize a speed pf processing image data rather than a quality of the images at the time of printing (Yes in S1). For example, when the plural images are each of the elements composing a table described in the XHTML-Print, and the number of pixels in each image at the time of printing is smaller than 160 pixels×120 pixels, the content determination unit 203a determines that the print content description data is a content for index print, and determines to prioritize a speed of processing image data rather than a quality of the images at the time of printing (Yes in S1). It should be noted that the method of placing the plural images, for example, in a lattice-like arrangement is not limited to the method in which table elements are used. However, in some cases, a high quality rather than print content description data for index print is expected despite that the above conditions are satisfied, as in the case of printing a content for label printing of 16 divisions. A condition "images differ from one another" can be added, for example, to the conditions for deciding the priority between a speed of processing image data and a quality of the images at the time of printing. A condition that plural images are placed in a lattice-like arrangement may be the only condition for the determination for the priority between a speed of processing image data and a quality of the images at the time of printing.

The number of pixels defined as 160 pixels×120 pixels is only an example of a "predetermined number of pixels" and the number of pixels shall not be limited to this. That is to say, the "predetermined number of pixels", employed by the content determination unit 203a as a criterion of judgment, includes such small number that human beings cannot judge even when degradation processing as to decrease the number of pixels is performed on the original image. For example, the "predetermined number of pixels" may be a size of 160 pixels×120 pixels or 3 cm×2 cm (print size) or a different size, which is already stored in a memory of the printer 200 (not shown in the diagram), or may be the number of pixels used for printing thumbnail images without reducing the print size.

The following considers a case where the printing resolution number is set as 200 dpi and a print size is defined as 0.4 inches×0.3 inches by the print unit 205 in the printer 200. When a main image has a size of 1600 pixels (horizontal)× 1200 pixels (vertical) while a thumbnail image has a size of 160 pixels (horizontal)×120 pixels (vertical), the print size of the main image is 8 inches (horizontal)×6 inches (vertical) and the print size of the thumbnail image is 0.8 inches (horizontal)×0.6 inches (vertical), assuming that each of the images is printed at the above printing resolution number 200 dpi. Since the print size of the image is specified as 0.4 inches (horizontal)×0.3 inches (vertical), the print size of the thumbnail image is to be reduced. In this case, the content determination unit 203a judges that the images are for index print.

The description comes back to the processing of printing. After that the content analysis unit 202 has analyzed the print content description data described in the XHTML-Print and the layout for printing, and also, a priority between a quality of the images at the time of printing and a speed of processing image data is determined, the print data generation unit 204 generates print data of bit image. Here, in the case where the priority decision unit 203 has decided to prioritize a speed of processing image data rather than a quality of the images at the time of printing, the print data generation unit 204 does not perform high-quality printing as in the case of normal photo printing, but speeds up the processing of generating print data.

The print data generation unit 204 usually refers to the location of the image file for the image to be printed, obtains via the data I/F unit 201 the image data of main images stored in the memory card 112 which is inserted into the memory-card slot 101 of the digital TV 100, and generates the print data of bit image by performing high-quality image processing, if necessary. However, in the case where it is determined to prioritize a speed of processing the image data rather than an image quality of the images at the time of printing, the print data generation unit 204 speeds up the processing of generating the print data.

Here, several detailed methods for speeding up the processing of generating the print data are explained.

<Method 1: Using Exif Thumbnail Images>

Since the print content description data is a content described in the XHTML-Print, the print data generation unit 204 obtains, from the memory card 112, the image data required for printing.

Here, the print data generation unit 204 obtains the image data of thumbnail images but not the image data of main images, from the memory card 112.

The Joint Photographic Experts Group (JPEG) file in the Exif format is composed of an "Exif header unit", a "Tiff unit" and a "JPEG data unit". The "JPEG data unit" stores the image data of main images in JPEG format while the "Tiff unit" stores data such as information on image data, shooting conditions, the image data of thumbnail images, and others. Therefore, the print data generation unit 204 obtains only the image data of thumbnail images stored in the "Tiff unit".

The data amount for the image data of thumbnail images is smaller than that of main images so that it requires a very short time to obtain the image data, and the time required for processing the image data is shorten. This leads to a great reduction in the time required for generating the print data of bit image, and thereby, a reduction in the time required for completing the printing.

It should be noted that in the case where the number of pixels in the image at the time of printing is smaller than the number of pixels in each of the thumbnail images included in the Exif file, a print size of the thumbnail images can be reduced. Even in the case where the number of pixels in the image at the time of printing is larger than the number of pixel in each of the thumbnail images, the print size of the thumbnail images can be enlarged since a high-quality image printing is not required.

In the present embodiment, an Exif format is used as an example of the image format, however, the file that can be applied to the present method may be a file including both the image data of main images and the image data of thumbnail images, and the format shall not be limited to an Exif file.

<Method 2: Skip High Quality Image Processing>

The print data generation unit 204 has a function to perform high-quality image processing on the obtained image data. It is usually assumed that the print data generation unit 204 performs the high-quality image processing such as noise reduction, gain control, contrast conversion, color correction, color adjustment, sharpness and others.

In the case of printing the images that do not require a high quality, as in the case of printing an index print, there is no need to perform the high-quality image processing. The print data generation unit 204 therefore skips a part or whole of the high-quality image processing. Consequently, the time required for processing image data as well as the time required for generating print data is shorten.

<Method 3: Decode Only a Direct Current (DC) Component of JPEG Image>

A case, in which the image data obtained by the print data generation unit 204 is image data of JPEG format, is assumed here. In this case, the print data generation unit 204 decodes only a DC component of the JPEG image data and ignores an Alternative Current component. Although the decoded image becomes mosaic-like and the reproducibility of images decreases, it is effective as a method for reducing the time required for generating print data since a high-quality image printing is not required.

<Method 4: Without Image Rotation Processing>

A case, in which a rotation of images is specified in the print content description data, is assumed here. In this case, the image is presented without rotation being performed on it. The print data generation unit 204 therefore does not perform the rotation processing even when the rotation of images is specified in the print content description data. This reduces the time required for processing image data. For this case, however, a unit may be placed in the printer 200 for asking the user's confirmation for not performing the rotation on the images since the way the image is rotated does not correspond to the user's intention in some cases.

The methods of speeding up the print data generating processing as described above may be operated independently or as a set of some or all of these methods. Another method of speeding up the processing may be added to them.

The print unit 205 receives the print data of bit image thus generated and eventually prints on a sheet the contents instructed by the application program execution unit 103.

As described above, even when it is not explicitly indicated, in the print content description data transmitted from the digital TV 100 serving as a non-PC host device, that a speed of processing image data rather than a quality of the images at the time of printing has to be prioritized, the printer 200 can determine to prioritize between the processing speed and the quality of the images. In the case where the processing speed is determined to be prioritized, the processing of speeding up is executed so as to shorten the time required for printing the images to be printed.

It should be noted that the digital TV 100 is used as a non-PC host device in the present embodiment, but the non-PC host device which can transmit the print content description data described in the print content description language, such as a Set Top Box (STB), a Digital Versatile Disk (DVD) recorder, and others, may be used instead.

Also, the image data stored in the memory card 112 is used in the present embodiment. The location of the image data, however, is not important. For example, the image data may be stored in a DVD media, and a DVD recorder may be used as a host device in order to implement the preset invention. The image data, which is obtained using a method or another including broadcasting and is stored on the memory in the host device, may be used. Moreover, the data, which is located in the destination of transmission connected to the host device via a communication unit, can be used.

The XHTML-Print is used as a description language for the print content description data in the present embodiment. The description language, however, is not limited to this and another language can be employed as far as the printer 200 can analyze it.

The operation relating to a display of the broadcast data performed by the image display unit 109 is omitted in the present specification since it does not directly relate to the present invention.

INDUSTRIAL APPLICABILITY

The printing apparatus according to the present invention generates print data with a priority given to a processing speed for generating print data over a quality of the images at the time of printing, even without explicit instructions indicated in the print content description data, in the case where a quality of images does not matter. Owing to this, the time required for printing can be reduced, and therefore, the printing apparatus of the present invention is useful for printing the image data obtained by a digital camera or the like.

What is claimed is:

1. A printing apparatus which receives, from an external apparatus, print content description data including information on a layout of an image described in a print content description language, and which prints the image, said printing apparatus comprising:
   a priority decision unit operable to decide whether to prioritize a quality of the image at a time of printing or a speed of processing of image data of the image, based on the print content description data including information on layout instructions for printing the image, the print content description data being transmitted from the external apparatus and received by said printing apparatus;
   a print data generation unit operable to generate print data for causing said printing apparatus to print data including the image, based on (1) the print content description data, (2) the decision made by said priority decision unit, and (3) the image data that is obtained from the external apparatus when the image data of the image laid out based on one of the layout instructions that is included in the print content description data is located outside of said printing apparatus; and
   a printing unit operable to perform printing based on the print data generated by said print data generation unit.

2. The printing apparatus according to claim 1,
   wherein in a case where a plurality of images are arranged in a sheet, and the print content description data indicates that the plurality of images are arranged in the sheet to be printed, said priority decision unit decides to prioritize the speed of processing of the image data rather than the quality of each of the plurality of images at the time of printing, and said print data generation unit generates the print data based on the decision made by said priority decision unit.

3. The printing apparatus according to claim 1,
   wherein in a case where a plurality of images are arranged in a sheet, and the print content description data indicates that (i) the plurality of images are arranged in the sheet to be printed and (ii) each of the plurality of images is to be printed at a number of pixels smaller than a predetermined number of pixels, said priority decision unit decides to prioritize the speed of processing of the image data rather than the quality of each of the plurality of images at the time of printing, and said print data generation unit generates the print data based on the decision made by said priority decision unit.

4. The printing apparatus according to claim 1,
   wherein in a case where (1) a plurality of images are arranged in a sheet, (2) the print content description data indicates that (i) the plurality of images are arranged in the sheet to be printed and (ii) each of the plurality of images is to be printed at a number of pixels smaller than a predetermined number of pixels, and (3) the plurality of images are different from one another, said priority decision unit decides to prioritize the speed of processing of the image data rather than the quality of each of the plurality of images at the time of printing, and said print data generation unit generates the print data based on the decision made by said priority decision unit.

5. The printing apparatus according to claim 1,
   wherein in a case where the print content description data indicates that the image is to be printed at a number of pixels smaller than a predetermined number of pixels, said priority decision unit decides to prioritize the speed of processing of the image data rather than the quality of the image at the time of printing, and said print data generation unit generates the print data based on the decision made by said priority decision unit.

6. The printing apparatus according to claim 1,
   wherein when said priority decision unit decides to prioritize the speed of processing of the image data rather than the quality of the image at the time of printing, and both image data of high resolution and image data of low resolution are generated for the image, said print data generation unit generates the print data based on the image data of low resolution.

7. The printing apparatus according to claim 1,
   wherein when said priority decision unit decides to prioritize the speed of processing of the image data rather than the quality of the image at the time of printing, said print data generation unit generates the print data by skipping a portion of the plurality of steps taken in processing the image data.

8. The printing apparatus according to claim 1,
   wherein when said priority decision unit decides to prioritize the speed of processing of the image data rather than the quality of the image at the time of printing, and Joint Photographic Experts Group format is used as a format of the image data, said print data generation unit generates the print data by decoding only a Direct Current component of the image data.

9. A method of printing an image with a printing apparatus which receives, from an external apparatus, print content description data including information on a layout of an image described in a print content description language, and which prints the image, said method comprising:

deciding whether to prioritize a quality of the image at a time of printing or a speed of processing of image data of the image, based on the print content description data including information on layout instructions for printing the image, the print content description data being transmitted from the external apparatus and received by the printing apparatus;

generating print data for causing the printing apparatus to print data including the image, based on (1) the print content description data, (2) the decision made in said deciding step, and (3) the image data that is obtained from the external apparatus when the image data of the image laid out based on one of the layout instructions that is included in the print content description data is located outside of the printing apparatus; and performing printing with the printing apparatus based on the generated print data.

10. A computer-readable medium encoded with a computer program for printing an image with a printing apparatus which receives, from an external apparatus, print content description data including information on a layout of an image described in a print content description language, and which prints the image, said computer program causing a computer to execute a method comprising:

deciding whether to prioritize a quality of the image at a time of printing or a speed of processing of image data of the image, based on the print content description data including information on layout instructions for printing the image, the print content description data being transmitted from the external apparatus and received by the printing apparatus;

generating print data for causing the printing apparatus to print data including the image, based on (1) the print content description data (2) the decision made in said deciding step, and (3) the image data that is obtained from the external apparatus when the image data of the image laid out based on one of the layout instructions that is included in the print content description data is located outside of the printing apparatus; and performing printing with the printing apparatus based on the generated print data.

* * * * *